Carey & Harris.
Shaft Hanger.
No. 99,156. Patented Jan. 25, 1870.
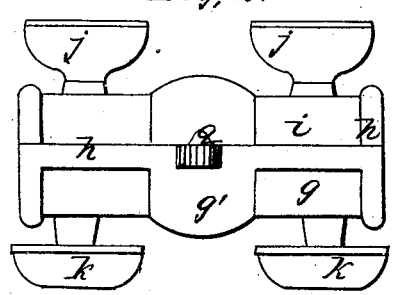
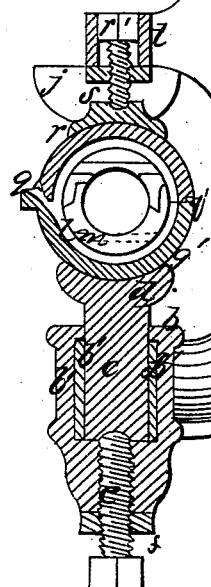
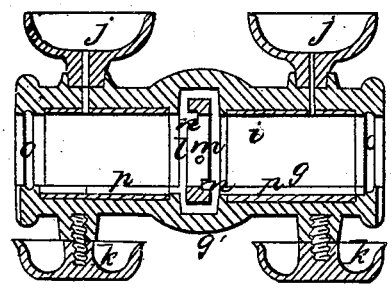
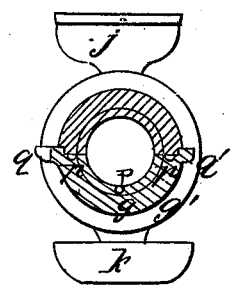
Witnesses,
Geo. C. Pevey
Jas. A. Pevey
Inventor,
Wilson W. Carey
Geo. W. Harris

United States Patent Office.

WILSON W. CAREY AND GEORGE W. HARRIS, OF LOWELL, MASSACHUSETTS.

Letters Patent No. 99,156, dated January 25, 1870.

IMPROVEMENT IN HANGERS FOR SHAFTING.

The Schedule referred to in these Letters Patent and making part of the same.

*To all whom it may concern:*

Be it known that we, WILSON W. CAREY and GEORGE W. HARRIS, both of Lowell, in the county of Middlesex, and State of Massachusetts, have invented new and useful Improvements in Hangers and Journal-Boxes; and we do hereby declare that the following is a full and exact description thereof, reference being had to the accompanying drawings, and to the letters of reference marked thereon.

Our invention consists of a convenient combination and arrangement of devices used in hangers and journal-boxes, and comprises a hanger and journal-box, with ball-and-socket joints, with an adjustable stem, to aid in adjusting the box in position, the box to be provided with an oiling-device, tallow cups, drips, and oil-receptacle, with channels for conveying the oil from each end of the box to the same, and a segment-ring, with buckets, which are secured to the journal, and revolve in the receptacle, supplying and keeping the same properly lubricated, thus providing and securing a lighter, convenient, durable, and cheaper hanger and box, and one easily kept in repair.

To enable others skilled in the art to make and use our invention, we will proceed to describe its construction and operation.

Figure 1 represents a side elevation of our improved hanger and journal-box, with parts sectioned, showing the operation of the same.

Figure 2 represents a side elevation of the journal-box.

Figure 3 represents a side elevation of the segment-ring, with its buckets.

Figure 4 represents a plan of the same.

Figure 5 represents a longitudinal section of the journal-box and ring.

Figure 6 represents a vertical section of the same.

Similar letters in the different figures indicate corresponding parts.

In construction, we form the body $a$ of our improved hanger as those now in common use.

At its bottom we form a socket, $b$, which we line with Babbitt, $b'$, or any equivalent soft metal, for the reception of the adjustable stem $c$, with its socket $d$.

Through the bottom of the socket $b$, the screw $e$ is passed, with its proper check-nut $f$, and connects with the stem $c$, the object of this screw $e$ being to adjust the stem $c$, when desired, and held in its required position by the check-nut $f$.

The box $g$ we form of the given length and diameter.

On its outside, and in its centre, we form a ball-joint, $g'$, to correspond with the socket $d$ of the stem $c$, and projections $h\ h$, running its entire length and around its ends.

To the cap $i$, we connect suitable tallow cups $j\ j$, their object being to indicate to the user, when empty, that the bearing requires to be lubricated.

On the box $g$, we connect the drips $k\ k$, which are secured to the same by screws.

$l$ is the oil-receptacle, which is formed in the centre of the box $a$ and cap $i$, inside of which the segment-ring $m$, with its buckets $n\ n$, revolves.

At each end of the box $g$ and cap $i$ are the recesses $o\ o$, which connect with the oil-receptacle $l$ by the channels $p\ p\ p$.

These recesses $o\ o$ prevent the oil from escaping from the box $g$ in large quantities, and the channels $p\ p\ p$ convey the same back to the receptacle $l$, where it is ready to be used again.

$q$ is the oiling-device.

$q'$ is the guide, which keeps the cap $i$ in its required position.

$v$ is the saddle, which, by aid of the screw $v'$ and nut $s$, keep the cap $i$ and box $g$ together, the head of the screw $v'$ sliding loosely in the socket $t$.

The advantages of this new combination and arrangement of devices are, that we have a hanger and journal-box that will adapt itself to the trueness of the shaft. If not true, by aid of the ball-and-socket joints $g'$ and $d$, it will yield to the demands of the same. And, further, if the hanger is not properly placed and secured, as is often the case, bringing the bearings of the box $g$ too high, low, or a little more one side than the other, by aid of the ball-and-socket joint $g'$ and $d$, and the adjustable stem $c$, this difficulty is remedied.

Oftentimes, in putting up a line of shafting, much inconvenience is experienced in having the rings whole, as, in case they are forgotten, the shafting has to be taken down, and the rings placed on; but with our device these rings $m$ can be and are put on the shafting, when placed in position, by their being made in segments. And again, by aid of the projections $h\ h$, we are enabled to furnish a much lighter box, and the channels $p\ p\ p$, arranged in these projections $h\ h$, so as to decline from the ends of the box $g$, toward the receptacle $l$, convey the surplus oil back to the same, where it is used again, instead of running out at the ends, into the drips $k\ k$.

In many cases, hangers and boxes are so placed, that oiling the bearing from the top is almost an impossibility; but by aid of the oiling-device $q$ this difficulty is done away with. By aid of the guide $q'$, the box $g$ and cap $i$ is kept in position.

Thus it will be seen, that we are enabled, by its compactness, symmetry of form, and the arrangement of these several devices, to produce a hanger and journal-box that will combine utility, durability, and novelty.

We do not claim the ball-and-socket joint, nor any of the devices separately, which are old and in common use; but What we do claim as our invention, and desire to secure by Letters Patent, is—

1. The guide $q'$, oiling-device $q$, and projections $h\ h$, in combination with the ball-and-socket joint $g'$ and $d$, when arranged to operate as described and set forth.

2. The adjustable stem $c$, with its socket $b$, lined with Babbitt or its equivalent soft metal, when arranged to operate in reference with the ball-and-socket joint $d$ and $g'$, substantially as described and set forth.

WILSON W. CAREY.
GEO. W. HARRIS.

Witnesses:
GEO. E. PEVEY,
J. A. PEVEY.